United States Defensive Publication [19] (H)

Prinz

[11] T961,001

[43] Aug. 2, 1977

[54] ELECTRONIC WATCH-CHRONOGRAPH

[75] Inventor: François Prinz, Brugg, Switzerland

[73] Assignee: Heuer-Leonedas S.A., Bern, Switzerland

[21] Appl. No.: 753,718

[22] Filed: Dec. 23, 1976

Related U.S. Application Data

[63] Continuation of Ser. No. 651,508, Jan. 22, 1976, abandoned.

[51] Int. Cl.[2] ..... G04F 8/00; G04B 19/30

[52] U.S. Cl. ..... 58/39.5; 58/50 R; 240/6.43

[57] ABSTRACT

An electronic watch-chronograph comprising a watch portion having an electronic arrangement for the measurement and display of the time of day, and a chronograph portion having an electronic arrangement for the measurement and display of the duration of a period of counted time, the first-mentioned display comprising statically-controlled display elements and the second-mentioned display comprising electroluminescent display elements.

4 Claims, 1 Sheet Drawing,

11 Pages Specification

The file of this unexamined application may be inspected and copies thereof may be purchased (849 O.G. 1221, Apr. 9, 1968).

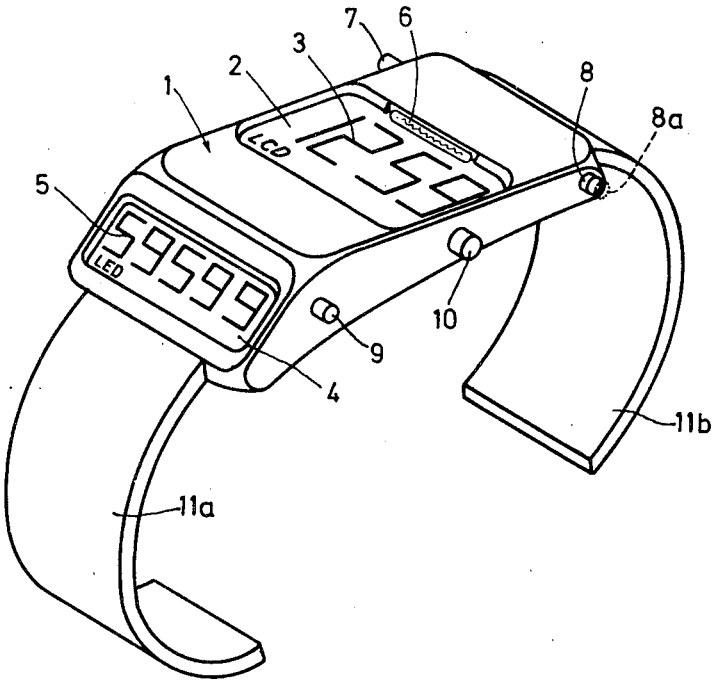

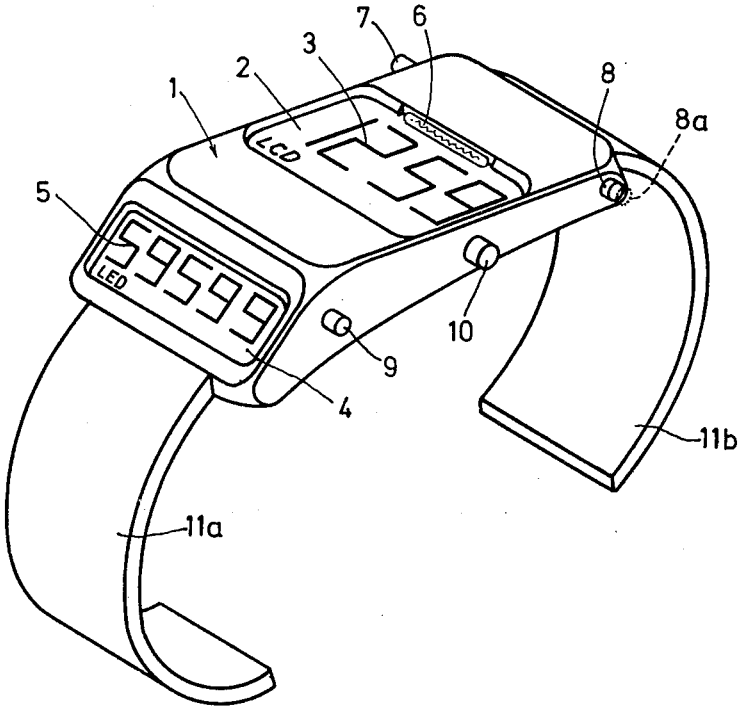
1
2
3
4
5
6
7
8
8a
9
10
11a
11b
LCD
LED